US006580254B2

(12) United States Patent
Schofield

(10) Patent No.: US 6,580,254 B2
(45) Date of Patent: Jun. 17, 2003

(54) APPARATUS AND METHOD FOR PROVIDING SPAN POWER TO COMMUNICATION EQUIPMENT AT A CUSTOMER PREMISE

(75) Inventor: Wade S. Schofield, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/802,400

(22) Filed: Mar. 9, 2001

(65) Prior Publication Data

US 2002/0130641 A1 Sep. 19, 2002

(51) Int. Cl.$^7$ .............................. G05F 1/34; H04M 3/00
(52) U.S. Cl. ...................... 323/234; 455/401; 379/386
(58) Field of Search ................................ 323/239, 240, 323/249, 282, 285; 455/401, 383, 90; 340/310.01, 310.02, 310.03, 310.05, 310.06; 379/386, 324

(56) References Cited

U.S. PATENT DOCUMENTS

| | | | | |
|---|---|---|---|---|
| 3,717,858 A | * | 2/1973 | Hadden | .................. 340/870.2 |
| 3,870,822 A | * | 3/1975 | Matthews | .................. 379/413 |
| 3,968,333 A | * | 7/1976 | Simokat et al. | ............. 379/413 |
| 4,639,714 A | * | 1/1987 | Crowe | .................. 340/310 R |
| 5,148,144 A | * | 9/1992 | Sutterlin et al. | ........ 340/310 A |
| 6,329,906 B1 | * | 12/2001 | Fisher et al. | .................... 340/1 |

* cited by examiner

Primary Examiner—Rajnikant B. Patel
(74) Attorney, Agent, or Firm—Luedeka, Neely & Graham, P.C.

(57) ABSTRACT

An apparatus and method are disclosed for providing backup power over communication wires from a central office of a service provider to a remote customer premise. In accordance with the invention, a high voltage direct current (HVDC) power signal and a digital data signal are combined and coupled to the communication wires at the central office. The combined signal is then transmitted along the communication wires to the remote customer premise. At the customer premise, the HVDC power signal is separated from the digital data signal. The HVDC power signal is then down converted into a low voltage direct current (LVDC) power signal that is coupled to premise communication wires at the remote customer premise. The premise communication wires them provide a path for the data signal and the LVDC power signal to the customer premise equipment (CPE). Thus, a reliable and safe source of backup power is provided for the CPE over existing communications wires.

19 Claims, 7 Drawing Sheets

APPARATUS AND METHOD FOR PROVIDING SPAN POWER TO COMMUNICATION EQUIPMENT AT A CUSTOMER PREMISE

FIELD OF THE INVENTION

The present invention relates generally to digital data communication systems. More particularly, the present invention relates to a new and improved method and apparatus for providing power to a communication device over communication wires coupled to the device.

BACKGROUND OF THE INVENTION

Communication systems have become increasingly important for individuals and businesses in the modern world. Because reliable communication systems are integral to most businesses, a loss of power to a business' communication system can have severe consequences for the business and its customers. For example, equipment such as an automated teller machine may become entirely useless upon a loss of power to its communication system. Because of undesirable financial and other consequences, many telecommunication systems utilize "always on" data and voice services. Thus, the increasing importance of communications has created a need for reliable backup power sources.

Prior art systems have used a number of methods to provide backup power to communication devices. For example, some businesses use generators to supply backup power to help keep essential services operational. However, these generator systems tend to be expensive and their use is typically limited to larger facilities. Batteries are also widely used to provide such a backup supply of power. Unfortunately, the use of batteries to supply backup power is deficient in a number of respects. First, batteries can only supply backup power for a limited amount of time. Thus, long power outages may exhaust the reserve supply of power stored in the batteries. Furthermore, batteries have a limited shelf life and, if not checked frequently and replaced, may have expired prior to the power outage. In addition, batteries may contain chemicals that pose environmental hazards and, thus, require specialized and expensive disposal.

Span power is used to power some communication devices such as a telephone providing plain old telephone service (POTS). Span power is supplied to the communication equipment on communication wires that are separate and distinct from the wires of the local electrical utility. This is the reason that a standard telephone will usually work even when power form the local utility is unavailable. Span power for POTS is a relatively economical and reliable backup power supply when compared to batteries. The voltage values associated with conventional communication equipment are low enough that they are generally not considered to be hazardous to people that may make contact with the voltages. Nevertheless, the central office communications equipment adapted to furnish a DC power signal as part of a data signal typically utilizes ground fault interruption (GFI) circuitry and current limiting devices for the protection of craftsmen and customers. However, due to the voltage and current limitations, the span power supplied over traditional telephone lines is only capable of providing a very limited amount of power, typically on the order of 50 milliwatts. This amount of power is insufficient to power many modern telecommunication devices. Providing a sufficient amount of span power to modern communication devices requires special wiring and restricted consumer access to the power supply in order to adhere to safety standards and building codes. Thus, traditional span power has some severe limitations, and if modified to provide sufficient power to modern communication devices, a substantial amount of expense may be incurred.

Therefore, what is needed is an economical and reliable method and apparatus for supplying power to a communication system when the local power supply is not available. The method and apparatus should be capable of supplying sufficient power for modern telecommunications equipment. Furthermore, the method and apparatus should conform to relevant safety standards and building codes in order to minimize the chance of harm to users of the communications equipment.

SUMMARY OF THE INVENTION

The preferred embodiment of the present invention is directed toward a method of delivering power to a customer premise over a twisted pair of wires used as a communication media for sending communication signals between a central location and the customer premise. The method combines a high voltage direct current (HVDC) signal with the communication signal to produce a combined signal at the central location. The combined signal is sent from the central location to the customer premise over the twisted pair. The HVDC signal is separated from the combined signal proximate the customer premise to provide a customer premise HVDC signal. The customer premise HVDC signal is then converted to a customer premise low voltage direct current (LVDC) signal. Most preferably, the converting of the customer premise HVDC signal to the customer premise LVDC signal is performed at a restricted location proximate the customer premise such that customer access to the customer premise HVDC signal is minimized. In an especially preferred embodiment, the HVDC signal has a value in the range of approximately 100–250 volts and the LVDC signal has a value in the range of approximately 25–75 volts. The customer premise LVDC signal is coupled to interior telecommunication wiring in the customer premise.

The above discussed embodiment provides a reliable power supply that is independent of a local power supply circuit. The HVDC power signal provides sufficient power for communication equipment while limiting the current to the capacity of the twisted pair. In addition, converting the HVDC power signal into a LVDC power signal at the customer premise produces a voltage that is less likely to injure persons that may come into contact with the communication system. Thus, the preferred embodiment of the present invention solves many of the aforementioned deficiencies of the prior art power supplies.

The present invention further provides a new and improved system for providing power from a central location to a remote location wherein communication signals are transferred between the central location and the remote location on communication wires. The system includes a high voltage power supply located at the central location. The high voltage power supply provides a HVDC power signal that is coupled to the communication wires. A voltage conversion unit located at the remote location is also coupled to the communication wires. The voltage conversion unit is preferably placed in a restricted area at the remote location such that human access to the HVDC power signal is minimized. The voltage conversion unit receives the HVDC power signal and converts the HVDC power signal to a LVDC power signal. The LVDC power signal is then coupled to premise communication wires located at the remote location. In order to maintain a good signal to noise ratio (SNR), filtering is used to limit the amount of noise produced by the voltage conversion unit that couples into the premise communication wires.

In an alternative embodiment, the voltage conversion unit includes a communication transformer having a first primary winding, a second primary winding, a first secondary winding, and a second secondary winding wherein each of the windings has first and second ends. The first ends of the first and second primary windings are electrically connected to the communication wires. An HVDC-to-LVDC converter (converter) has an input connected to the second ends of the first and second primary windings and has an output connected to the first ends of the first and second secondary windings. The second ends of the first and second secondary windings are electrically connected to the remote wires. The converter is configured for receiving HVDC power from the communication wires through the primary windings and applying LVDC power to the remote wires through the secondary windings. The communication transformer provides a path for communication signals to pass to and from the communication wires and the premise communication wires.

The above described system improves upon the prior art by providing a reliable power supply that avoids the replacement issues associated with using batteries as a source of power. Furthermore, by converting the HVDC power signal to a LVDC power signal, the above described system allows a sufficient amount of power to be transmitted to a remote location while minimizing contact at the remote location to hazardous voltage levels. Thus, the above described system substantially improves upon the prior art.

DETAILED DESCRIPTION

Span power typically refers to a central office source furnishing power to a repeater or regenerator on a telecommunication twisted pair ("communication pair"). However, span power may also refer to supplying power to a remote site or customer premise. In the present invention, span power is primarily used to provide backup power as a replacement for battery backup power. However, it will be appreciated by those skilled in the art that the present invention may also serve as the sole power source for a communication or other system. A span supplied voltage provides power for customer premise equipment ("CPE") at a remote site. The span supplied backup power to the CPE, in the present invention preferably an integrated access device (IAD), preferably does not supply power to other equipment at the remote site. For example, the span power apparatus of the present invention preferably does not furnish power to auxiliary equipment that is coupled to the CPE, such as a desktop computer or other equipment, that requires much more than just a few watts. However, if the power demand of the auxiliary equipment is low and the need is important, such as for lifeline telephone service, span power may be utilized.

The twisted pair for providing a connection between a central office and a remote site is typically a twisted pair of 22, 24 or 26 gauge wire of lengths up to approximately 20,000 feet. When a data signal or telephone signal arrives at a remote site, such as a customer premise, the signal is coupled to the premise wires which are typically about the same gauge wire as the twisted pair. The premise communication wires were never intended to supply power to CPE, but are considered a safe power conducting path if the voltage across and the current through the pair are relatively low.

Figure 1:
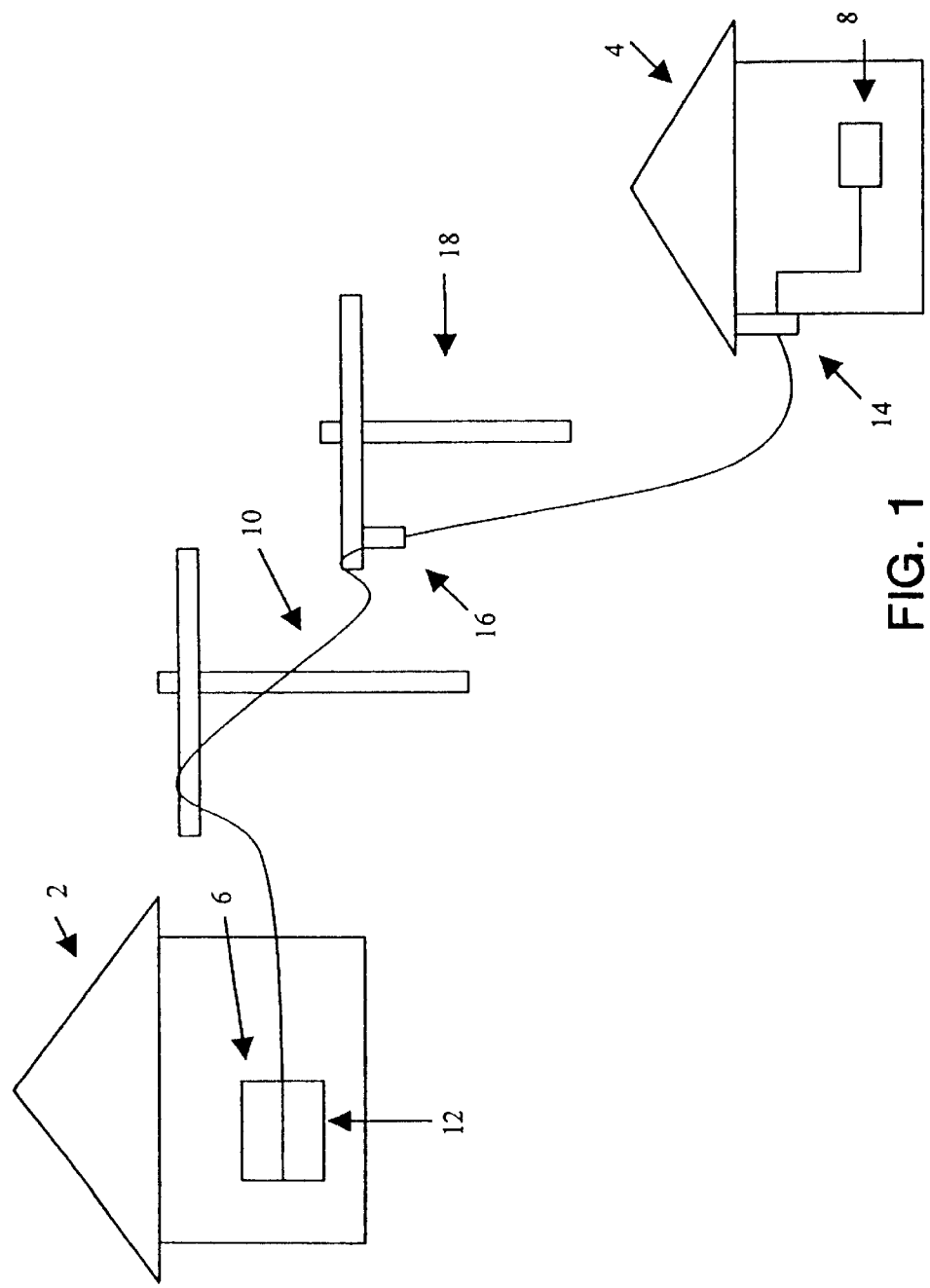
FIG. 1 is a graphical representation of a communication power system for providing power to a remote location.

Referring now to FIG. 1, a preferred system in accordance with the present invention is shown. The system may be used to provide power from a provider's central office 2 to communication equipment 8 at a remote customer premise location 4 such as an Integrated Services Digital Network (ISDN) transceiver or a Digital Subscriber Line (DSL) transceiver. The central office 2 of the service provider has a communication device 6 for sending data signals to a piece of customer premise equipment 8 located in the remote customer premise location 4. Typically, the communication link between the central office 2 and the remote customer premise location 4 is a twisted pair of communication wires 10. However, it will be readily appreciated by those skilled in the art that the present invention could also be implemented over other types of transmission wires such as coaxial cable, etc.

The central office 2 of the service provider also contains a HVDC power source 12. The HVDC power source 12 couples a HVDC signal onto the communication wires 10 at the central office 2. Preferably, this HVDC signal has a voltage value in the range of 100–250 volts. The HVDC signal, in combination with the data signal, is transmitted over the communication wires 10 to the remote location 4. At the remote location 4, the communication wires are received by a DC conversion unit 14. The HVDC signal is coupled to the DC conversion unit and converted to a LVDC signal. The DC conversion unit 14 is preferably positioned at the remote customer premise location 4 in a restricted area in order to minimize human contact with the HVDC signal. In an alternative embodiment, the DC conversion unit 14 may be placed in the service provider's transmission system 18 in a location, such as location 16, that is near the remote customer premise location 4. Positioning the DC conversion unit 14 in such a manner that customer access to the HVDC signal is minimized insures the communication system adheres to local safety and building codes.

The DC conversion unit 14 converts the HVDC signal into a LVDC signal. Transmitting a HVDC signal to a remote location and converting that signal to a LVDC signal is beneficial in a number of respects. Due to line losses, the HVDC signal may be transmitted a longer distance that a LVDC signal. While the distance between the central office 2 of the service provider and the remote customer premise 4 varies a great deal, the communication wires 10 are typically between 5,000 ft and 20,000 ft in length. Thus, as a result of the line losses (voltage drop and power loss) inherent in communication wires of this length, it is desirable to use a HVDC signal for transmitting power over the communication wires. In addition, the communication wires 10 are typically 24 gauge to 26 gauge wires and such wires are not capable of carrying relatively high currents. Thus, it is necessary to transmit a HVDC signal over the communication wires 10 for span power applications.

Once the DC conversion unit 14 has converted the HVDC signal into a LVDC signal, the DC conversion unit 14 couples the lower voltage signal to the customer premise communications equipment 8. In the preferred embodiment, the output of the DC conversion unit 14 is filtered to condition the LVDC signal by removing any high frequency noise. The LVDC signal preferably consists of a DC voltage of approximately 25–75 volts that supplies approximately 1–8 watts of power. However, it will be readily appreciated by one skilled in the art that the present system could be adapted to provide greater amounts of power depending upon the requirements of the particular customer premise equipment 8 to be powered.

The primary advantage of the above discussed system is that it provides a safe source of power to the customer premise equipment 8. Examples of the types of customer premise equipment that might utilize the present invention are IAD units using asymmetric digital subscriber line (ADSL) or symmetric high bit rate digital subscriber line (G.shdsl) technology. It is beneficial for a communication system to have its own backup power source that is independent of the local power grid. The backup system of the present invention will keep the data communication system operational during a power outage caused by a storm or other occurrence. Often the same types of occurrences, such as a bad storm, that lead to a loss of power increase the need for communications. For example, such a situation may require the contacting of emergency services with a life line, the monitoring of a security system, the verification of credit status by a point of sale (POS) systems, etc. Thus, it is a substantial benefit to have communication systems that are "always on".

Another advantage of the above discussed system is that it does not expose a user at the remote customer premise 4 to potentially hazardous voltages. Because the relatively low voltages to which a user might be exposed are considered non-hazardous, it is not necessary for the customer premise 4 to install additional wiring or make other modifications to comply with safety and building codes. Thus, the low voltage signal provides power on the existing communication wires at the customer premise. Because there is little or no additional wiring cost incurred when using the existing communication wires, the present invention provides a competitive advantage over prior backup power systems.

Figure 2:
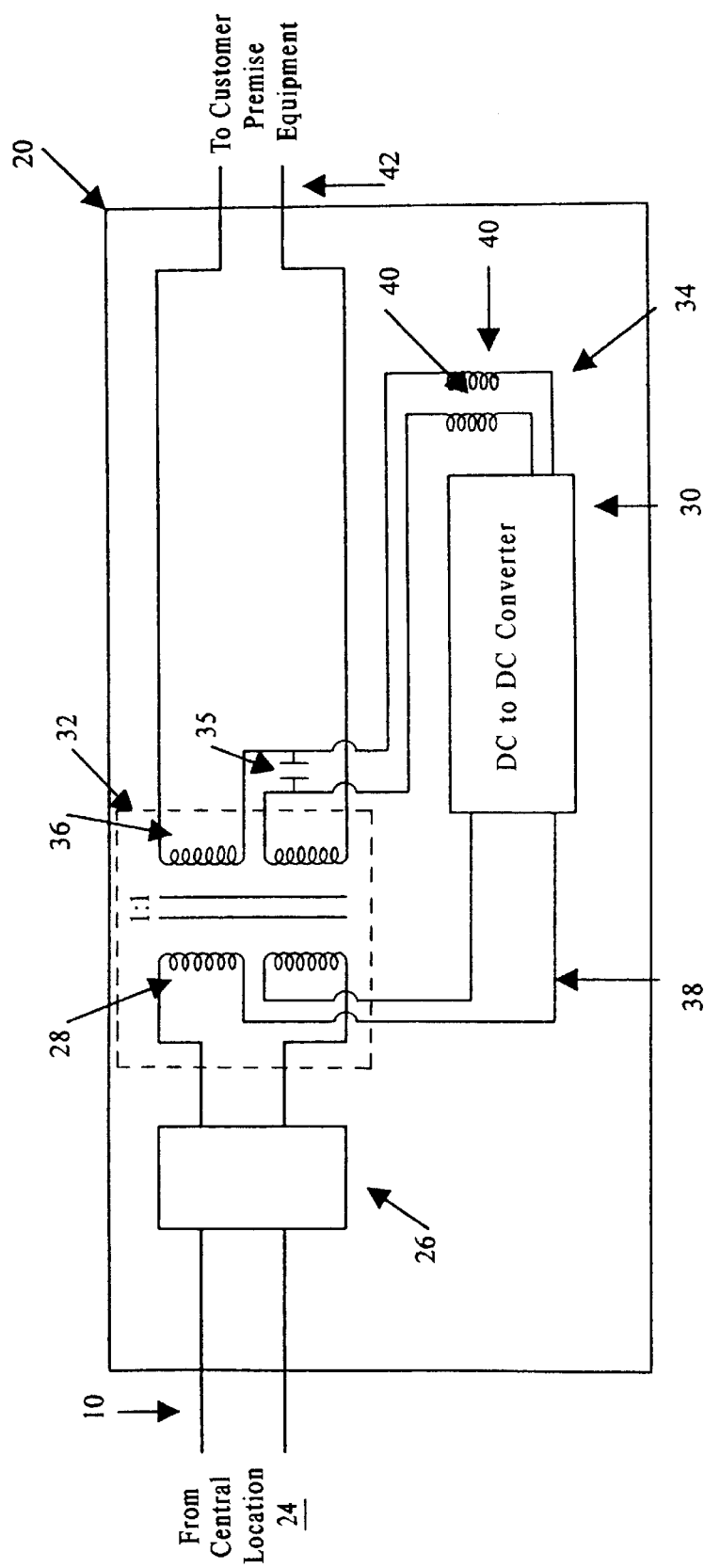
FIG. 2 is a block diagram of a preferred voltage conversion unit in accordance with the present invention.

Referring now to FIG. 2, a block diagram of a preferred external receiving unit 20 in accordance with the present invention is shown. The external receiving unit 20 is connected to the communication wires 10 such as a twisted pair from a central location 24 such as the central office of a digital subscriber line service provider. The wires 10 transport both a communication signal and a HVDC power signal. The wires 10 are preferably received by a protection block 26 that contains protection circuitry such as a surge protector that limits or prevents random and unpredictable voltage surges from sources such as lightning from damaging the external receiving unit 20 or entering the customer premise. The protection block 26 couples the communication wires 10 to the input 28 of a transformer 32 and through the transformer to a converter 30.

The input 38 to the converter 30 is coupled to the output of the protection block 26 through the transformer 32. Thus, the DC current present in the wires 10 flows into the input of the converter 30. The converter 30 converts the HVDC signal into a LVDC signal. The output 34 of the converter is coupled through the split windings of the secondary to the output 36 of the transformer 32. In order to reduce noise transfers from the converter 30 to the communication data signals, internal filters are provided within the converter to allow only DC and low frequency signals to be coupled to and from the converter 30. Thus, the converter 14 acts as a stop band filter with respect to the relatively high frequencies of the data signal. If the internal filters of the converter 30 allow too much converter noise to be coupled to the communication wires, it may be necessary to provide external filtering through filtering devices such as the inductors 40 or capacitor 35. The output 36 of the transformer 32 also contains the communication signals that were received by the external receiving unit 20 and transferred through the transformer 32. The LVDC signal and the communication signal, now a remote combined signal, are coupled from the output 36 of the transformer 32 to premise wires 42 leading to the customer premise equipment.

Preferably, the external receiving unit 20 of FIG. 2 is mounted such that customer access to the unit is restricted. Examples of such restricted locations would be underground, on transmission poles carrying the communications wires, or on the eaves of the building containing the customer premise equipment. However, these locations are exemplary only and it will be readily appreciated by those skilled in the art that there are a number of additional restricted locations in which the external receiving unit 20 could be placed such that customer access to the higher voltages is minimized or eliminated.

Figure 3:
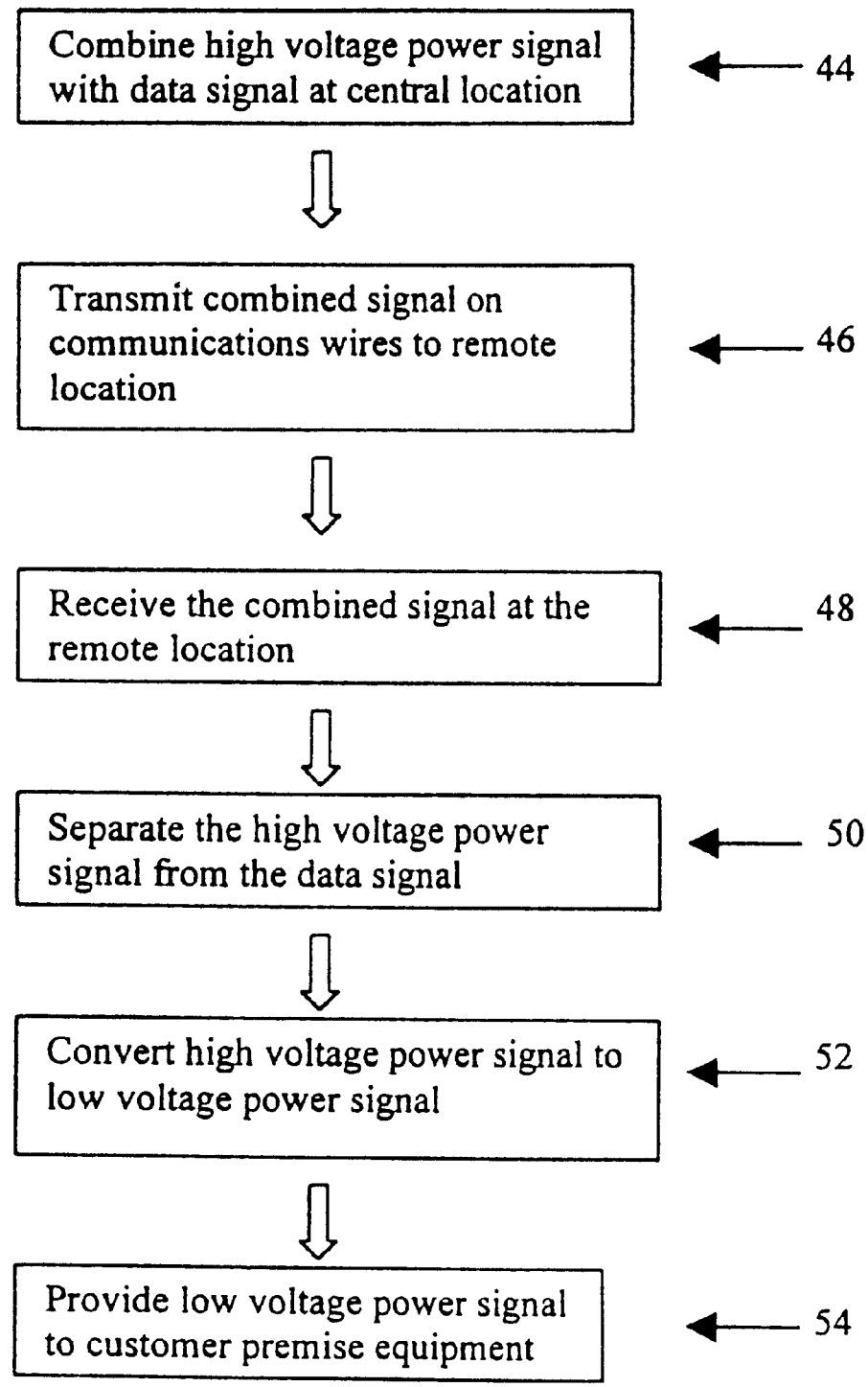
FIG. 3 is a flow chart of a preferred method of providing span power to customer premise equipment.

The present invention also encompasses methods for providing backup power to a remote location. A flowchart of a preferred method is depicted in FIG. 3. The method commences in block 44 with the combining of a HVDC power signal and a data signal at a central location. The data signal could be any type of data signal such as a data signal for an Integrated Services Digital Network (ISDN) service, Digital Subscriber Line (DSL) service, High-bit-rate Digital Subscriber Line (HDSL) service or standard telephone (POTS) service. After the data signal and the HVDC power signal are combined, the combined signal is transmitted on communication wires to a remote location in step 46. In block 48, the combined power and data signal is received at the remote location. The communication wires are preferably a twisted pair known as a local loop. However, it will be appreciated that the present invention may be implemented with almost any type of wire such as coaxial cable, etc. The HVDC power signal is separated from the data signal in block 50. The HVDC power signal is then converted to a LVDC power signal in step 52. Finally, in step 54, the LVDC power signal is provided to customer premise equipment at the remote location.

The above discussed method eliminates the need for a backup power source such as batteries in the customer premise equipment. Batteries require routine checking and replacement to insure that they have not lost their power generating capacity. This required maintenance results in additional costs in terms of time and money for the user of the communication system. Furthermore, during long power outages, the energy contained in the batteries may be used up causing the customer premise equipment to lose power and resulting in failure of the communication system. By eliminating the disadvantages of battery power and their continual need for replacement, the present invention provides an improved method of providing backup power and, thus, results in considerable savings in time and money. In addition, the reliability of the communication system is improved for systems provided with a constant supply of on demand backup power.

Figure 4:
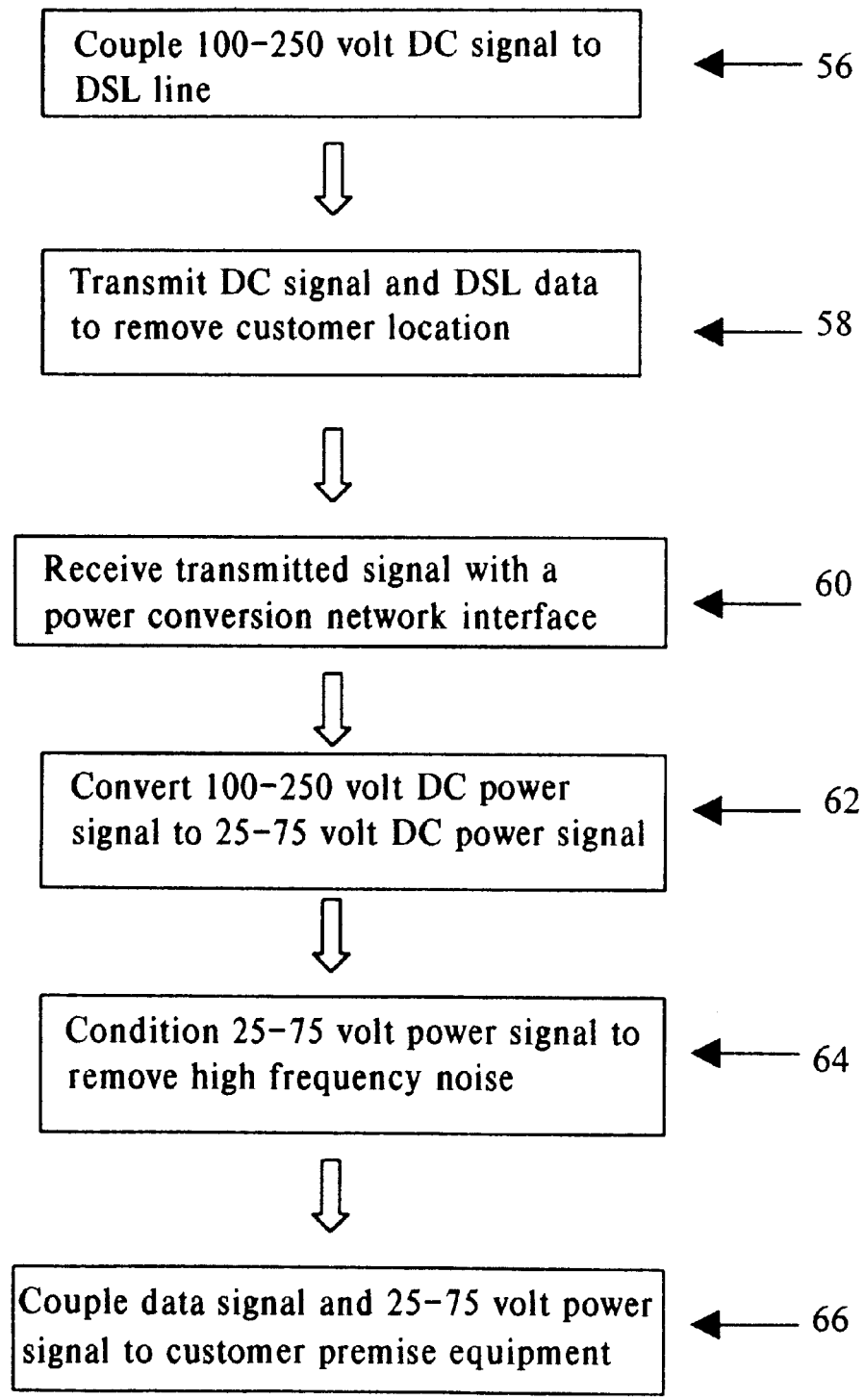
FIG. 4 is a flow chart of an alternative method of providing span power to a remote customer location.

Referring now to FIG. 4, a flow chart of an alternative embodiment of the present invention is shown. The alternative method begins with the coupling of a DC signal having a value in the range of approximately 100–250 volts to a twisted pair of wires providing DSL service to a remote customer premise in block 56. The DC signal is then transmitted, combined with the DSL data signal, to a remote customer location along the twisted pair of wires as represented in block 58. In block 60, the combined power and data signal is received with a power conversion network interface unit (NIU). As shown in block 62, the power conversion NIU converts the HVDC power signal having a value in the range of approximately 100–250 volts into a LVDC power signal having a value in the range of approximately 25–75 volts. Next, in block 64, the approximately 25–75 volt LVDC power signal is subjected to signal conditioning in order to insure that it is within tolerances for the customer premise equipment. Depending upon the length of the twisted pair over which the power signal and the data were transmitted and the electrical noise present on the twisted pair, the signal conditioning of block 64 may or may not be required. Finally, in step 66, the DSL data signal and the approximately 25–75 volt LVDC power signal are coupled to the customer premise equipment. These signals are coupled to the customer premise equipment over existing premise communication wires.

Figure 5:
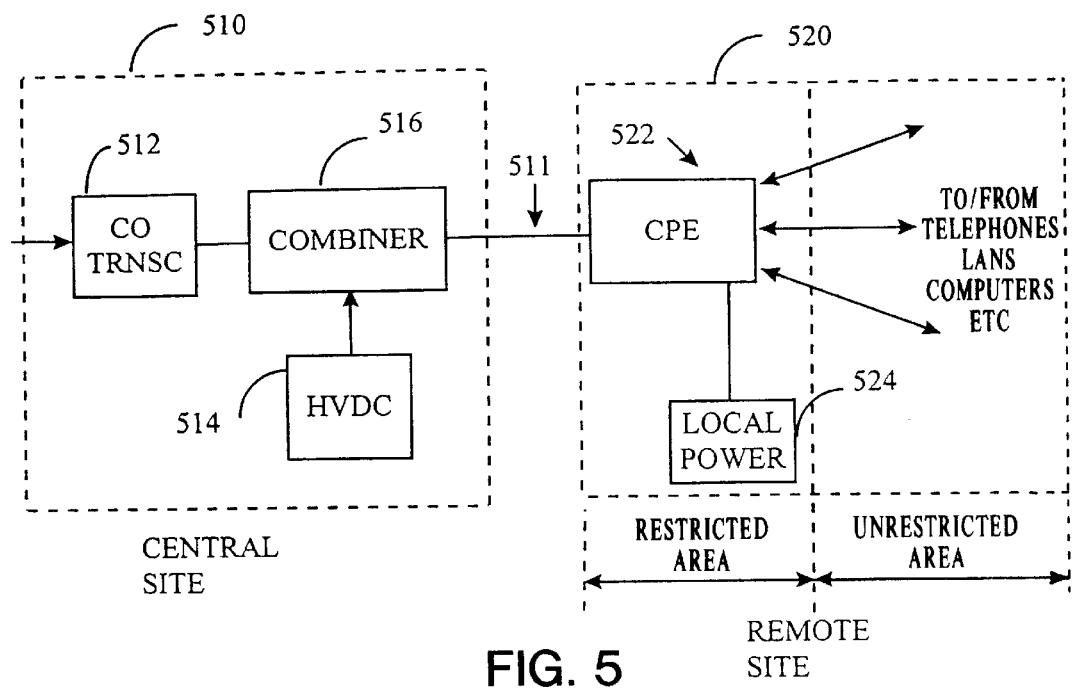
FIG. 5 is block diagram of an apparatus for providing span power from a central site to a remote site.

FIG. 5 illustrates an arrangement for supplying span power to a remote site. In accordance with the arrangement, central site equipment 510 is connected to remote site equipment 520 via a twisted pair or subscriber line 511. The central site equipment 510 supplies a data signal to the remote site equipment 520. In the arrangement of FIG. 5, a power signal is also sent to the central site 510 from the remote site 520. The twisted pair 511 furnishes power from the central site 510 to a remote site 520 when a local power source 524 is unavailable to the remote site equipment 520 and also provides a channel for full duplex data communication. The central site equipment 510 includes a central office ("CO") transceiver 512 and a HVDC power source 514 coupled to a combiner 516 to generate a combined signal. The combiner 516 is a preferably a transformer having dual or split windings in the secondary wherein the interior ends of each of the windings are coupled to the HVDC source. Thus, the secondary windings of the combiner 516 are split in a manner similar to the secondary windings 36 of the communications transformer 32 of FIG. 2. In the arrangement of FIG. 5, the CPE 522 must be mounted near or on an exterior wall because the remote site HVDC may have a hazardous value. On short subscriber lines, the voltage at the remote site 520 will have a value nearly equal to the HVDC value of the power source 514. However, for a long subscriber line the voltage drop on the line 511 may reduce the value of the voltage at the remote site 520 to a less hazardous value. The HVDC source 514 preferably also has ground fault interrupt protection and current limiting devices as a means for protecting equipment and personnel.

Because the arrangement of FIG. 5 places the CPE 522 in a restricted area, which may be an inconvenient and undesirable location, it may not be desirable for every situation. Therefore, the preferred embodiments of the present invention allow the CPE 522 to be placed in a more desirable location, typically at a central location in the building or structure at the remote site.

Figure 6:
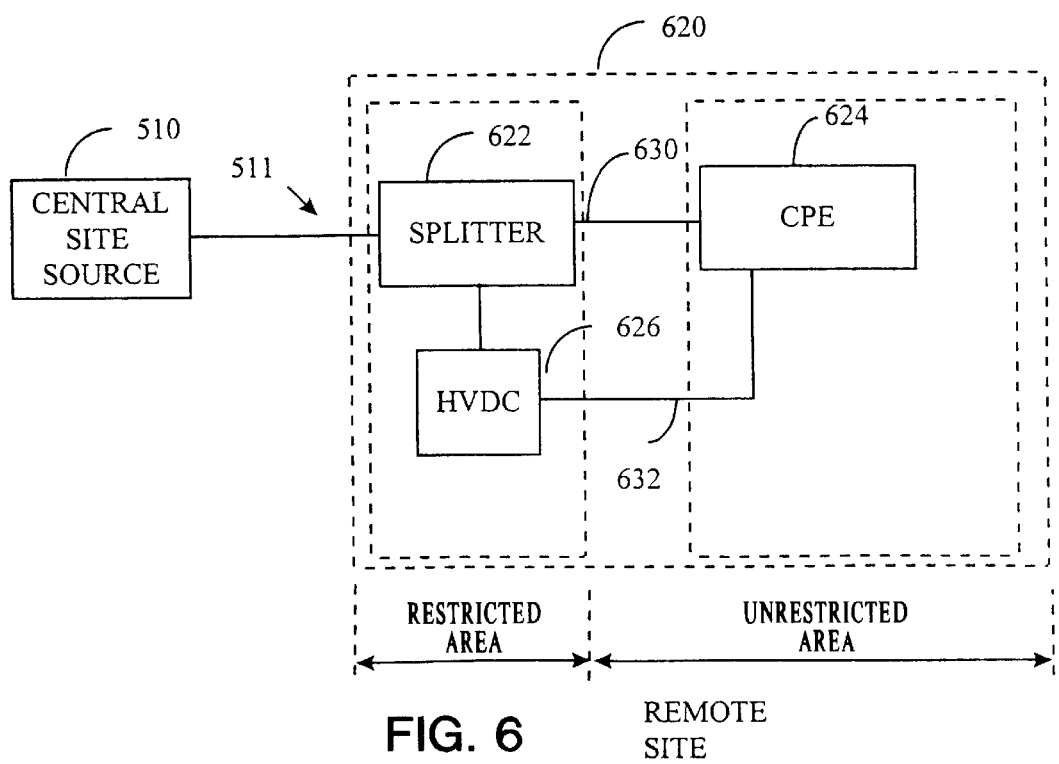
FIG. 6 is a block diagram of a preferred apparatus for providing span power from a central site to a remote site.

Referring now to FIG. 6, there is illustrated an improved apparatus for providing span power in accordance with the present invention. The central site source 510 provides a combined data and power signal over a twisted pair 511 to the remote site 620. A splitter 622 at the remote site 620 separates the combined signal into a data signal from and a remote HVDC power signal. The splitter 622 preferably includes a communication transformer having split primary windings for receiving the combined signal. The data signal is coupled to centrally located customer premise equipment 624 via premise communication wires 630 and the remote HVDC is coupled to a HVDC conditioner 626 for filtering and coupling backup power to the CPE 624 via a power wire pair 632. The power wire pair 632 is a special wire pair, meeting appropriate safety codes, for transferring power from an exterior wall to the centrally located CPE 624. Although the embodiment of the present invention as illustrated in FIG. 6 is an improvement over the prior art, the cost of installing the special wire pair 632 may not be acceptable in many applications.

Figure 7:
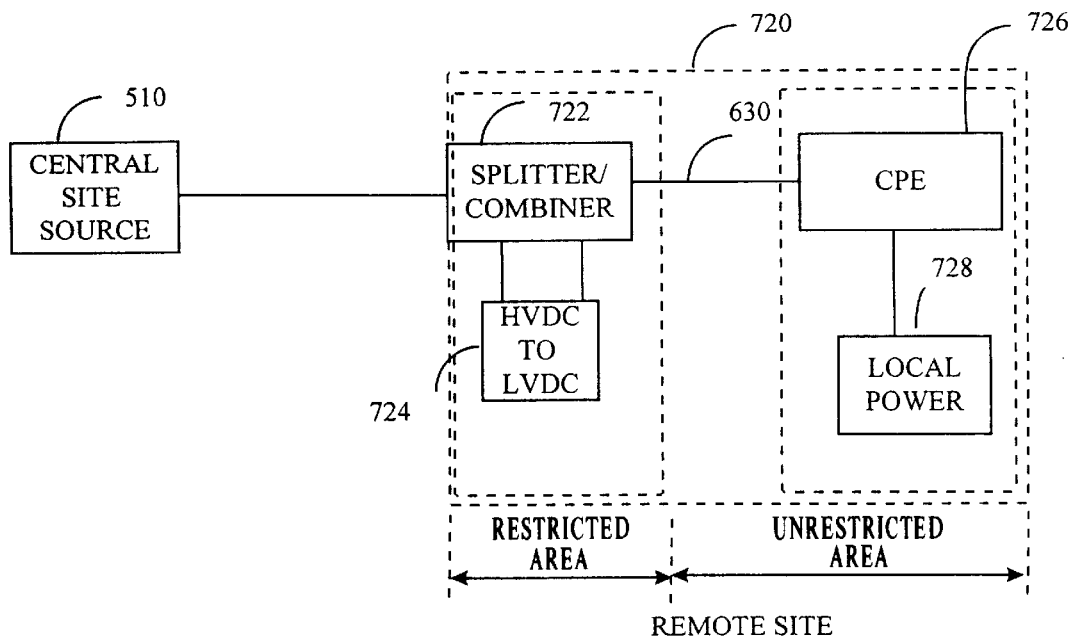
FIG. 7 is a block diagram of an apparatus that uses remote site communication wires as a path for backup power.

A second embodiment of the present invention as illustrated in FIG. 7 allows local site communication wires to serve as a path for backup power. When communications wires are used to furnish power to the CPE, there is no need for the special wires 632 of FIG. 6. The central site source 510 provides a combined data and power signal for transmission over a twisted pair to a remote site 720. A splitter/combiner 722 separates the remote HVDC power signal from the data signal. The data signal is sent over local communication wires 630 to the CPE 726. The splitter 722 sends the HVDC power signal to a converter 724. The converter 724 converts the HVDC power signal to a LVDC power signal and sends the LVDC power signal back to the combiner element of the splitter/combiner 722. Typically, the converter 724 is constructed such that it does not couple high frequency energy to and from the communication wires 620. The splitter/combiner circuit 722 is a transformer with split windings in the primary and the secondary windings similar to the communication transformer 32 shown as shown in FIG. 2. Hence, the premise communication wire 630 going to the CPE 726 has a combined signal comprised of a data signal and a LVDC power signal. The splitter/combiner 722 may also have input and output filtering to maintain a satisfactory signal-to-noise ratio on the premise communication wires 630 at the remote site. External filtering, although not shown in FIG. 7, may also be required in some particular applications. The LVDC power signal is used to provide backup power for the CPE 726 in the event the local power source 728 is disabled.

The embodiments of FIG. 6 and FIG. 7 provide substantial improvements over the prior art apparatus for providing span power. The CPE at the local site normally receives power from a local power source such as the local utility company. At some local sites, battery backup power supplies or generator backup power supplies, including fuel cells, motor driven generators and other well-known sources, may be used. In such cases, the present invention could serve as a secondary backup power source. Furthermore, the present invention could also be used to provide power to a remote set of rechargeable batteries to insure that they are always fully charged. Alternatively, the span power of the present invention may also serve as the sole source of power. Furthermore, if a customer does not elect to use the backup span power of the present invention, the HVDC source at the CO may be disabled and the CPE at the remote site allowed to function without the backup power source of the present invention.

Figure 8:
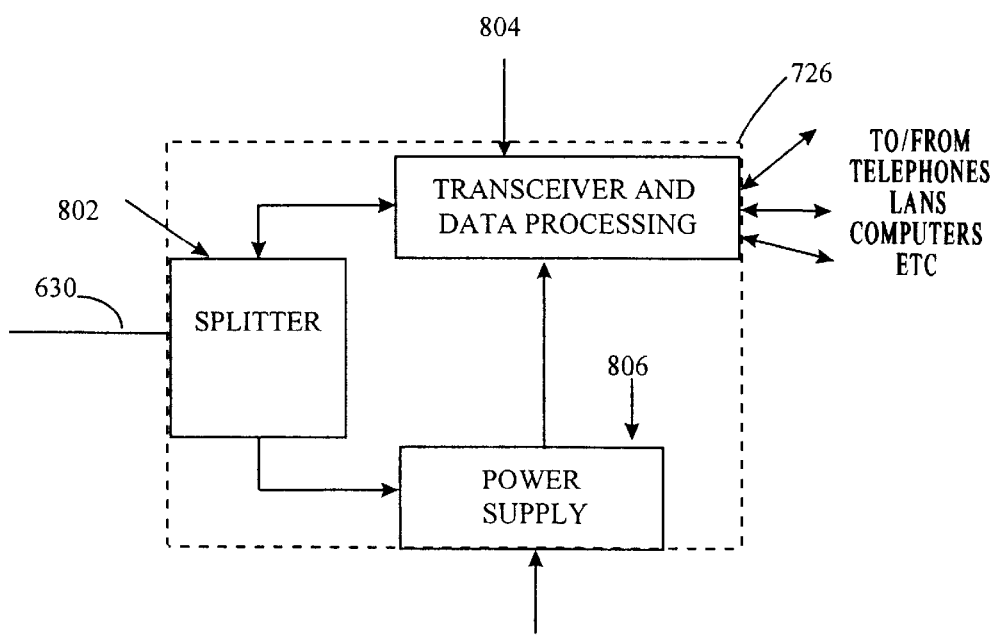
FIG. 8 is a block diagram of a circuit for separating a data signal from a power signal and selectively enabling the power signal.

FIG. 8 illustrates a detailed view of the internal elements of the CPE 726 shown in FIG. 7. The combined signal carried on the premise communication wires 630 is received by a splitter 802. The splitter 802 separates the LVDC power signal from the data signal. The data signal is coupled to the transceiver and data processing unit 804 such that data can be transmitted to, and received from, a remote central site 510 by the CPE 726. The transceiver and data processing unit 804 couples the data signal to CPE such as a telephones, LANS, computers, etc.

The splitter 802 couples the LVDC power signal to power supply 806 for the CPE. The local power supply 806 provides power to the transceiver and data processing unit 804 of the CPE 726. The LVDC power signal is coupled to the local power supply 806 such that the LVDC power signal is only utilized when the local power source 728 is disabled. As will be appreciated by one skilled in the art, this type of function may be implemented with a diode arrangement that asserts the LVDC power signal when the local power supply voltage falls below a specified level. Thus, the splitter 802 couples the data signal to the transceiver and data processing unit 804 such that full duplex communication between the CPE 726 and the central office 510 is enabled. In addition, the splitter 802 also couples the power signal to the power supply 806 such that backup power is available when the local power source 728 fails.

Figure 9:
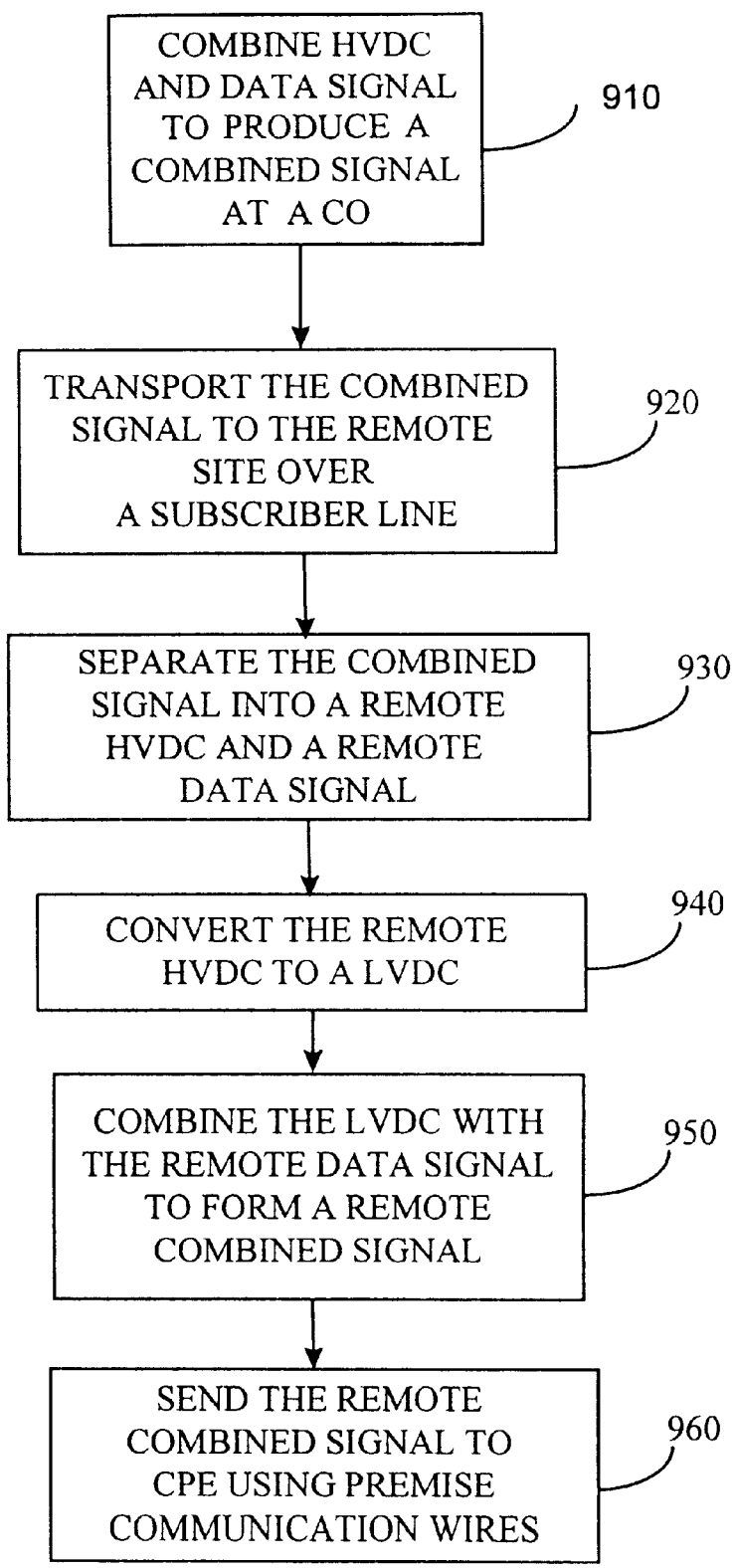
FIG. 9 is a block diagram of method of down converting a HVDC signal that is combined with a data signal to a LVDC signal.

FIG. 9 is a flow chart of a method of transmitting a combined data and power signal from a central office to premise communication wires at a remote site. The method commences with step 910 wherein a HVDC power signal and a data signal are combined at a central office. The combined signal is transported from the central office to the remote site over a subscriber line in step 920. In step 930, the combined signal is then separated into a remote HVDC power signal and a remote data signal at the remote site. Once the combined signal has been separated, the HVDC power signal is converted to a LVDC power signal in step 940. The LVDC power signal and the remote data signal are recombined in step 950 to form a remote combined signal. This remote combined signal is then sent to the CPE using the premise communication wires at the remote site in step 960.

The method of FIG. 9 provides the previously discussed benefits of providing span power to the CPE without exposing individuals at the remote site to hazardous voltages. Thus, the method provides a reliable source of backup power for communication equipment while complying with applicable safety standards and building codes. Furthermore, the method accomplishes this result without the need for expensive special wiring or the disadvantages associated with batteries. Therefore, the method of FIG. 9 is a substantial improvement upon the prior art.

While we have shown and described several preferred embodiments in accordance with the present invention, it is expressly understood that the present invention is not limited to the particular embodiments described herein, but is susceptible to numerous modifications as recognized by one skilled in the art. Therefore, the true scope of the present invention is as set forth in the following claims.

I claim:

1. A method of delivering power to a customer premise over communication wires used as a communication media for sending a communication signal between a central location and a customer premise, the method comprising the steps of:

combining a HVDC signal with the communication signal to produce a combined signal at the central location;

sending the combined signal from the central location to the customer premise over the communication wires;

separating the HVDC signal from the combined signal proximate the customer premise to provide a customer premise HVDC signal;

converting the customer premise HVDC signal to a customer premise LVDC signal; and coupling the customer premise LVDC signal and the communication signal to premise communication wires in the customer premise.

2. The method of claim 1 wherein the step of converting the customer premise HVDC signal to the customer premise LVDC signal is performed in a restricted location proximate the customer premise such that customer access to the customer premise HVDC signal is restricted.

3. The method of claim 1 further comprising the step of filtering the customer premise LVDC signal to prevent noise from coupling to the premise communication wires.

4. The method of claim 1 wherein the customer premise HVDC signal has a value between approximately 100–250 volts and wherein the step of converting the customer premise HVDC signal to a customer premise LVDC signal further comprises converting the customer premise HVDC signal having a voltage value in the range of approximately 100–250 volts to the customer premise LVDC signal having a voltage value in the range of approximately 25–75 volts.

5. A method of providing power from a central location to a remote location wherein data is transferred between the central location and the remote location over communication wires, the method comprising the steps of:

combining a HVDC power signal with a data signal at the central location;

transmitting the combined HVDC power signal and the data signal from the central location to the remote location on the communication wires;

separating the HVDC power signal from the data signal at the remote location;

converting the HVDC power signal to a LVDC power signal; and combining the LVDC power signal and the data signal at the remote location.

6. The method of claim 5 wherein the step of providing access to the LVDC power signal at the remote location further comprises coupling the combined LVDC power and data signal to premise communication wires at the remote location.

7. The method of claim 5 wherein the step of converting the HVDC power signal to the LVDC power signal is performed in a restricted location at the remote location.

8. The method of claim 5 wherein the HVDC power signal has a voltage value between approximately 100–250 volts and wherein the step of converting the HVDC power signal to the LVDC power signal further comprises converting the HVDC power to a LVDC power signal having a voltage value between approximately 25–75 volts.

9. A system for providing power from a central location to a remote location wherein communication signals are transferred between the central location and the remote location on communication wires, the system comprising:

a high voltage power supply located at the central location wherein the high voltage power supply produces a HVDC power signal and couples the high voltage power signal to the communication wires; and a receiving unit located at the remote location and coupled to the communication wires wherein the receiving unit receives the HVDC power signal and converts the HVDC power signal to a LVDC power signal and couples the LVDC power signal to premise communication wires located at the remote location.

10. The system of claim 9 wherein the communication wires further comprise a twisted wire pair.

11. The system of claim 9 wherein the receiving unit is positioned at the remote location in a restricted area such that human access to the HVDC power signal is minimized.

12. The system of claim 9 wherein the receiving unit further comprises a HVDC-to-LVDC converter.

13. The system of claim 12 further comprising filters for isolating the converter from the premise communication wires.

14. The system of claim 11 wherein the HVDC power signal has a voltage value between approximately 100–250 volts and the LVDC power signal has a voltage value between approximately 25–75 volts.

15. The system of claim 9 wherein the receiving unit further comprises:

a communication transformer having a primary winding connected to the communication wires and a secondary winding connected to the premise communication wires for transferring AC signals from the communication wires to the premise communication wires; and a converter having an input connected to the communication wires and having an output connected to the premise communication wires for receiving HVDC power from the communications wires and producing low voltage DC power on the premise communication wires.

16. The system of claim 9 wherein the receiving unit further comprises:

a communication transformer having a first primary winding, a second primary winding, a first secondary winding, and a second secondary winding, each of the windings having first and second ends;

electrical connections between the first ends of the first and second primary windings and the communication wires;

a converter having an input connected to the second ends of the first and second primary windings and having an output connected to the first ends of the first and second secondary windings; and electrical connections between the second ends of the first and second secondary windings and the premise communication wires;

wherein the converter is configured to receive the HVDC power signal from the communication wires through the primary windings and apply the LVDC power signal to the premise communication wires through the secondary windings; and wherein the communication transformer is configured to receive the data signal from the communication wires and apply the data signal to the premise communication wires.

17. An apparatus for providing power from a central office to premise communication wires of a customer premise over communication wires, said apparatus comprising:

a central office transceiver for transmitting and receiving data signals;

a central office power supply for producing a HVDC power signal;

a combiner for combining transmitted data signals from the central office transceiver with the HVDC power signal from the central office power supply to form a combined signal and coupling said combined signal to said communication wires;

a splitter for receiving said combined signal and separating said combined signal into a premise data signal and a premise HVDC power signal;

a high voltage-to-low voltage, DC-to-DC converter for converting the premise HVDC power signal into a premise LVDC power signal; and a premise combiner for combining said premise data signal and said premise LVDC power signal and coupling said combined premise signal to said premise communication wires.

18. The apparatus of claim 17 further comprising customer premise equipment for receiving said combined premise signal from said premise communication wires wherein said customer premise equipment has a second splitter for separating the combined premise signal into the premise data signal and the premise LVDC power signal.

19. The apparatus of claim 17 wherein said customer premise equipment further comprises a backup power selection device for coupling said premise LVDC power signal to said customer premise equipment when a primary power supply of said customer premise equipment is unavailable.

* * * * *